Oct. 9, 1962   R. L. SANDVIG   3,057,417
DRILL SYSTEM WITH SUCTION REMOVAL OF CUTTINGS
Filed Aug. 12, 1958
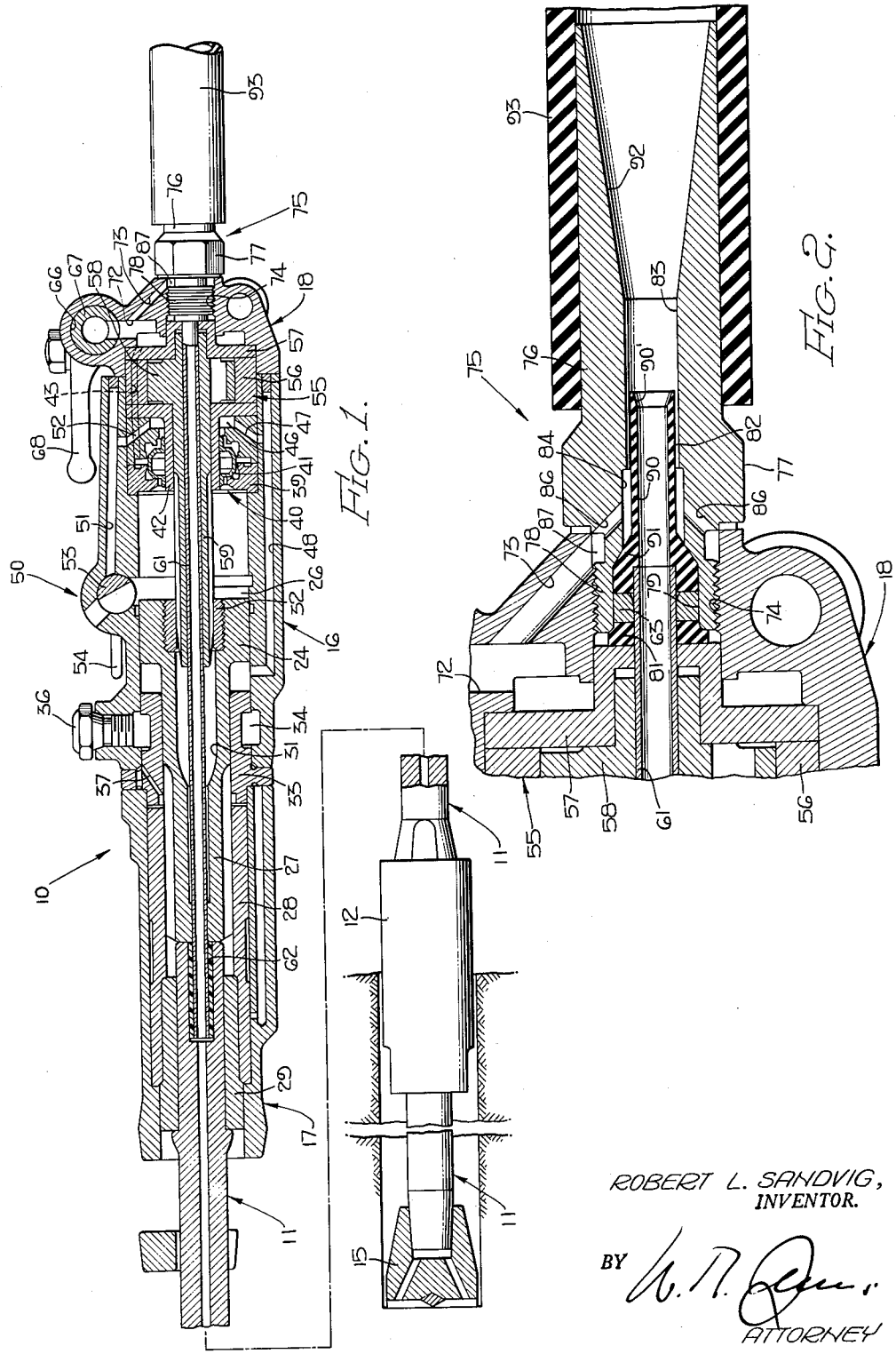
ROBERT L. SANDVIG,
INVENTOR.
BY
ATTORNEY

United States Patent Office 3,057,417
Patented Oct. 9, 1962

3,057,417
DRILL SYSTEM WITH SUCTION REMOVAL
OF CUTTINGS
Robert L. Sandvig, Whittier, Calif., assignor to Thor
Power Tool Company, Aurora, Ill., a corporation of
Delaware
Filed Aug. 12, 1958, Ser. No. 754,639
3 Claims. (Cl. 175—212)

The present invention relates to drills in general and particularly to pneumatically actuated drilling apparatus adapted to drill rock, concrete and other hard substances by either rotary or percussive cutting action and featuring improved means for removing the chips, cuttings and dust by aspiration using pressurized air delivered to the drilling apparatus.

The present invention is a continuation-in-part of the invention disclosed in my co-pending application for United States Letters Patent Serial No. 636,311 filed January 25, 1957, entitled Drill System With Suction, now Patent 2,919,901.

Heretofore it has been the practice in operating pneumatic drills to employ pressurized air or water to carry away cuttings in the annular space between the drill steel and the bore wall. Necessarily, either flushing agent must flow through the very small passage in the hollow drill steel to the bottom of the bore hole, thence into the relatively much greater void of the annular passage enclosed by the walls of the bore hole. This results in reduction of velocity of the flushing agent, limiting its capacity to carry in suspension the cuttings from the bore hole, and consequently reducing the potential efficiency of the pneumatic rock drill. Where pressurized air is employed as flushing agent, a great volume of fine dust is discharged into the atmosphere surrounding the operator and impairing his health. If water is used, provision for its supply must be made at considerable cost. In mines, the used flushing water deposits slimes over roadbeds, causes a pumping expense, and often results in subsidence of props when the mine floors are soaked.

The system proposed in the aforesaid co-pending application provides an improved apparatus for aspirating the cuttings through the hollow drill steel and delivering them in a confined stream to a suitable filtering collector. Such a system represents a considerable improvement over prior chip removal systems and has operated in a satisfactory manner except when drilling certain softer and moisture containing formations. When operated under these circumstances it is found that a ring of fine cuttings tend to collect near the discharge end of the aspirating tube causing the latter to operate with decreased efficiency and, under certain circumstances, to become inoperative through actual clogging. Various expedients employed in attempts to obviate this clogging action have been unavailing so long as the aspirating tube is formed of good heat conducting material. The substitution of an aspirator formed of poor heat conducting material avoided all tendency of the tube to clog and it was then found to operate with full efficiency to remove both soft and hard rock cuttings as well as cuttings having a high moisture content.

Accordingly, it is an object of the present invention to provide an improved aspirating device for removing drill cuttings utilizing pressurized air.

Another object of the invention is the provision of a pneumatically operated drill apparatus having an aspirator provided with an aspirating tube formed of poor heat conducting material and effective to prevent condensation of moisture in the cuttings as they pass through the tube and the impacting of the cuttings on the tube walls.

Another object of the invention is the provision of a pneumatically operated drilling apparatus having an air operated aspirator for removing cuttings through the drill and delivering the same to an air and cuttings separator and featuring in particular means for preventing clogging of the aspirator through condensation of moisture flowing through the aspirator.

These and other more specific objects will appear upon reading the following specification and claims and upon considering in connection therewith the attached drawing to which they relate.

Referring now to the drawing in which a preferred embodiment of the invention is illustrated:

FIGURE 1 is a longitudinal sectional view through a pneumatically operated drilling apparatus incorporating the present invention; and FIGURE 2 is a fragmentary cross-sectional view on an enlarged scale through the aspirator per se.

Referring to FIGURE 1, there is shown a drilling apparatus designated generally 10 known as a rotary percussive-type pneumatically-actuated drill. Suitably chucked in one end of the apparatus is a hollow drill steel 11, which may be formed in sections connected by suitable couplings 12. At the forward end of the drill steel 11 is a drill bit 15 formed with interior passages in communication with the bore of the drill steel.

The body of the drilling apparatus is seen to comprise an elongated piston cylinder 16 closed at one end by a fronthead 17 and at the opposite end by a backhead 18. Cylinder 16 is secured to the front and backhead members in suitable manner by means such as bolts not shown. Within the body of the apparatus formed by cylinder 16 and head members 17, 18 are the generally conventional working parts of the drill proper. Piston hammer 24 reciprocates longitudinally of cylindrical chamber 26, its shank 27 extending forwardly inside the fronthead 17 where it engages an elongated chuck driver 28 rotatably mounted within the fronthead. Shank 27 of piston 24 has sliding engagement with chuck driver 28 through interengaging splines to the end that rotation of piston 24 is transmitted to chuck driver 28, and to chuck 29 seating drill steel 11. Piston 24 is provided with an interior longitudinal bore 31 of varying size which extends the full length thereof and is counterbored at the enlarged end of the piston where it interiorly seats a threaded rifle nut 32. Between chuck driver 28 and the head of piston 24 there is provided a cylinder front bearing 33 slidingly supporting an enlarged portion of piston shank 27. Bearing 33 is to be understood as forming the forward end of cylinder 26 and is exteriorly grooved in cooperating relationship to the interior surface of cylinder 16 to form a channel 34 for lubricant supplied through a port normally closed by a removable plug 36.

An interior passage 37 connects channel 34 with the surfaces of piston shank 27 and chuck driver 28. The rear end of cylinder 26 is closed by a valve unit 40 including a chest 39 and a reciprocal valve 41 supported on a valve guide 42. Chest 39 is interiorly connected by passage 43 to the interior of backhead 18 to receive pressurized air and, depending upon the position of valve 41, directs air into the adjacent end of the cylinder housing piston 24 or into its opposite end through chamber 46, conduits 47, 48. An exhaust valve 50 positioned between the opposite ends of cylinder 26 has its interior connected to the cylinder and also to chamber 46 of valve 40 through passages 51, 52. Valve element 53, under the control of handle 54, controls the flow of air from the opposite ends of cylinder 26 to which it is alternately connected as piston 24 reciprocates. When valve 53 is closed, the used air cannot escape and the piston remains inactive.

A piston-rotating unit 55 located adjacent valve unit 40 includes a ratchet ring 56 positioned between transverse walls provided at one side by the radial flange of valve guide 42 and at the other side by a centrally cupped plate 57. A rotor element 58, mounted for step-by-step rotation in valve guide 42 and the central cup in plate 57 includes an elongated shaft portion 59 which extends through cylinder 26 and is formed exteriorly with inclined ribs or splines meshing with cooperating ribs or splines on the interior of rifle nut 32.

Unshown ratchet means forming no part of the present invention cooperates with rotor 58 and ring 56 to permit the rotor to advance step-by-step in one direction of rotation under a force received from the piston through the rifle nut but prevents this rotation in the opposite direction. As a result the interengaging rifling upon nut 32 and shaft 59 advances the rotor upon travel of the piston in one direction while the rotor itself is turned as it travels in the opposite direction. The turning of the piston is transmitted to chuck driver 28 and by that member to chuck 29 and the connected drill steel to rotate bit relative to the work surface.

Rotor 58 with its elongated shaft 59 is centrally bored its entire length, similar bores extending through the rotor, and also through an aligned aperture in end plate 57 for the purpose of supporting a tube 61 for the rock cuttings. This tube extends beyond rotor 58 and through central bore 31 of piston 24, its forward end having a fluid tight seat in a Teflon sleeve 62 fixedly seated in the counterbored end of drill steel 11 in a manner disclosed in applicant's co-pending application Serial No. 624,552, filed November 27, 1956, now abandoned. At its opposite end and beyond cup plate 57, tube 61 is secured by brazing, welding or the like to a ring 63 and is normally separated from the end surface of cup plate 57 by a resilient gasket ring 81.

Backhead 18 includes a valve chamber 66 seating a rotary valve element 67 controlled by a handle 68. Air under pressure enters valve chamber 66 from a fitting connected in conventional manner through an elongated flexible hose to a source of pressurized air, not shown. The interior of backhead 18 is formed with an air passage 72 to which passage 43 leading to the valve chest connects and with a second passage 73 which intercepts a centrally located internally threaded seat 74 formed in the backhead and into which tube 61 extends. Threads 74 opening axially from the backhead serve to seat the threaded shank end 78 of an ejector or aspirator unit designated generally 75 and which will now be described.

Aspirator unit 75 comprises an elongated tubular body 76 formed centrally with a wrench-engageable exterior surface 77 by which its threaded shank 78 can be tightly seated in threads 74. Shank 78 is formed with a counterbore 79 seating and centering therewithin tube 61 and its supporting ring 63. Aspirator 75 is formed longitudinally thereof with a venturi passage 82 having its inlet end opening into counterbore 79 and its flaring outlet end 92 discharging into a flexible hose 93 leading to any suitable filtering device for separating the air from the cuttings. It will be understood that the venturi passage includes a restricted or throat portion 83 opening at its inlet end to a larger diameter annular chamber 84 connected by a plurality of ducts 86 with an annular chamber 87 formed between the aspirator shank 78 and threaded bore 74. Chamber 87 connects to the aforementioned backhead passage 73 leading to valve chamber 66.

An important feature of the invention comprises a relatively short aspirator tube 90 having an enlarged end 91 shaped to seat snugly in bore 79 of shank 78 with its interior passage in axial alignment with tube 61. As is made clear by FIGURE 2, the axial end of enlarged portion 91 seats firmly against the face of ring 63, it being understood that the assembly of the aspirator 75 within threaded bore 74 forces the surfaces of enlargement 91 into firm seating contact with the juxtaposed surfaces of shank bore 79. The opposite or discharge end of aspirator tube 90 terminates concentrically within venturi throat 83 with its exterior side walls closely spaced to the walls of throat 83. Desirably, the discharge end of the aspirator tube flares outwardly as is indicated at 90'.

Aspirator tube 90 is preferably formed of poor heat conducting material and desirably of non-metallic insulating material such as a suitable rubber, plastic or other elastomeric material in order that the marked temperature reduction of the aspirating air occasioned by the rapid decrease in pressure as it passes through the throat of the venturi may not cause condensation of water vapor present in the air and rock cuttings passing through aspirator tube 90. Thus, when aspirator tube 90 is formed of a reasonably good heat conducting material, such as metal, it is found that the low temperatures produced in the aspirating air passing between the exterior of the aspirator tube and the adjacent side walls of the throat causes condensation of vapor passing through aspirator 90 with the result that dust and other finer portions of the cuttings collect on the side wall of the aspirator and eventually cause plugging of this passage and a cessation of the flow of cuttings. This result is entirely avoided if the aspirator tube 90 is formed of a poor heat conductor or insulator such as elastomeric materials, ceramic, or the like, of which there are a large number of suitable materials. The tendency for the plugging of the aspirator tube is particularly pronounced where the material being drilled is relatively soft and porous, but is present wherever the cuttings or the air entrained with the cuttings contains a considerable percentage of moisture.

The operation of the described apparatus is as follows. Drill bit 15 is advanced against the work to be drilled and valve element 67 is opened to supply pressurized air to valve chest 39 through passages 72 and 43 and also to the aspirator through passage 72, 73, chamber 87 and ducts 86. Valve element 41 is thereby actuated by the pressurized air as this air is alternately fed to cylinder 26 form the opposite sides of piston 24 causing that member to reciprocate at high speed, the expanded gases escaping to the atmosphere through escape valve 50. The reciprocating piston 24 delivers rapidly repeated percussive blows against the end of drill steel 11 and also effects the step-by-step rotation of that element as it reciprocates through the cooperation of rifle nut 32 with the rifled shank 59 of rotor 58 which is enabled to rotate only in one direction under controlled means forming no part of the present invention. The described step-by-step movement is reflected in the rotational advance of the piston and is transmitted by it to the drill steel through the chuck driver 28 and chuck 29. This action results in effective hammering at drill bit 13 and produces chips, cuttings and dust which must be removed if drilling efficiency is to be maintained.

Pressurized air directed to aspirator 75 serves to remove these chips, cuttings and dust by suction and to deliver the same to a suitable filtering device. Thus, the pressurized air entering the inlet end 84 of the venturi passage flows at high velocity through throat 83 into the flaring expansion chamber 92 provided at the outlet portion of the venturi. This very high velocity air flow past the discharge end of aspirator tube 90 serves to reduce the pressure within the aspirator tube materially below atmospheric pressure and to create a flow of air downwardly through the bore hole entering the hollow interior of the drill steel at very high velocity and entraining along therewith a steady flow of cuttings, chips and dust as they are formed by the action of bit 13. Thus, the debris formed by the bit is literally flushed from the bit face into the bore of the drill steel. This air and entrained debris travel in a straight line from the bit through the drill steel, through the tube 61 and aspirator tube 90 into the stream of actuating air flowing through the venturi throat and past the end of the aspirator tube.

It may be desirable, at intervals, during operation of the apparatus to employ the pressurized air for bore hole cleaning purposes only. For example, certain materials being drilled may break up so easily as to exceed the suction removal capacity of the aspirator. To employ the aspirator independently of the operation of the drill, it is only necessary to close valve 50 so that used air cannot be exhausted with the result that the pneumatic motor ceases to operate. However, pressurized air continues to flow to the aspirator with the result that the cuttings continue to be sucked from the bore hole and to be carried to the filter in the manner described above where they are separated from the air and retained while the clean air is exhausted to the atmosphere. If it is desired to discontinue operation of both the air motor and the aspirator, it is only necessary to close valve 67 thereby discontinuing the supply of pressurized air to the apparatus.

While the particular rock drill apparatus and foul-proof aspirator herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a pneumatically operated rock drill assembly of the type having a hollow drill steel in communication with a suction air tube extending longitudinally through said assembly and into a backhead member at its outer end, that improvement which comprises a foul-proof aspirator mounted in said backhead in registry with the adjacent end of said air tube, said aspirator having a venturi passage therethrough having a restricted throat, a tubular fitting of low heat conductivity extending axially of the inlet end of said venturi passage with one end connected to said suction air tube and its other end discharging into the throat of said venturi, and means for supplying pressurized air from said rock drill assembly into the narrow annular chamber formed between the discharge end of said tube and said venturi passage to aspirate a flow of air and drill cuttings through said drill steel and suction air tube, the low heat conductivity of said tubular fitting being effective to prevent sufficient lowering of the temperature of the air and drill cuttings flowing therethrough by heat transfer from the colder suction-inducing surrounding air stream to cause condensation of moisture and the ensuing impacting of the cuttings on the interior surfaces of said tubular fitting.

2. The invention defined in claim 1 characterized in that said tubular fitting is formed of non-metallic insulating material whereby the pressure reduction in the pressurized air flowing therepast does not cause condensation of moisture in air and chips passing through said tubular fitting and the collection of a dust ring on the interior side walls of said fitting.

3. An aspirating assembly for connection to the outer end of a pneumatically operated rock drill, said assembly comprising an elongated body having a venturi passage extending therethrough, means on the inlet end thereof for detachably supporting said assembly on said drill, a tubular fitting of poor heat conducting elastomeric material supported axially within the inlet end of said venturi passage with its inner end concentrically spaced inwardly from the walls of said passage and discharging into the throat portion of said venturi passage, means for connecting the inlet end of said tubular fitting to a chip conveying passage adapted to communicate with the bottom of a bore hole, and means for delivering pressurized aspirating air to the annular space between said fitting and the inlet end of said venturi passage, to aspirate a flow of chips through said fitting, the poor heat conducting characteristics of said fitting being effective to prevent condensation of moisture in said cuttings to cause clogging of said fitting with impacted cuttings.

References Cited in the file of this patent

UNITED STATES PATENTS

| 783,218 | Murray | Feb. 21, 1905 |
| 2,643,641 | Huffman | June 30, 1953 |
| 2,839,273 | Holman et al. | June 17, 1958 |